United States Patent [15] 3,673,438
Lund [45] June 27, 1972

[54] MOS INTEGRATED CIRCUIT DRIVER SYSTEM

[72] Inventor: George E. Lund, Berwyn, Pa.

[73] Assignee: Burroughs Corporation, Detroit, Mich.

[22] Filed: Dec. 21, 1970

[21] Appl. No.: 100,065

[52] U.S. Cl. ....................307/270, 307/247, 307/251, 307/304

[51] Int. Cl. ....................H03k 3/26

[58] Field of Search ....................307/205, 221 C, 247, 251, 270, 307/279, 304

[56] References Cited

UNITED STATES PATENTS

| | | | |
|---|---|---|---|
| 3,260,863 | 7/1966 | Burns et al. | 307/251 X |
| 3,480,796 | 11/1969 | Polkinghorn et al. | 307/205 X |
| 3,506,851 | 4/1970 | Polkinghorn et al. | 307/251 |
| 3,541,353 | 11/1970 | Seelbach et al. | 307/205 X |
| 3,575,614 | 4/1971 | Polkinghorn et al. | 307/251 |

*Primary Examiner*—Stanley T. Krawczewicz
*Attorney*—Paul W. Fish, Edward J. Feeney and Charles S. Hall

[57] ABSTRACT

An integrated circuit driver system utilizing Metal-Oxide-Silicon Field-Effect Transistors (MOS FET's) is disclosed for operation in a two-phase mode for driving a substantially capacitive load. A preferred embodiment of the invention makes use of an alternating current (ac) voltage having a peak-to-peak magnitude somewhat greater than the direct current (dc) supply potential. An auxilliary dc power supply is implemented for converting the ac voltage to an operating potential for inverters which in turn provide the phase inverted signals required by a pair of drivers. The latter generate the alternate phases of the output voltage presented to the load. Additionally, the system exploits the MOS threshold voltage dropping properties to realize a threshold shift of suitable magnitude to insure the required duty cycle of the driver output pulse waveforms.

15 Claims, 4 Drawing Figures

INVENTOR.
GEORGE E. LUND
BY
Francis A. Varallo
AGENT

MOS INTEGRATED CIRCUIT DRIVER SYSTEM

BACKGROUND OF THE INVENTION

The invention disclosed herein was made in the course of, or under a contract with, the Department of the Navy.

The use of MOS FET devices has become increasingly widespread in the electronics industry. The devices provide solid state voltage amplification with very high input impedance, and feature complete isolation of input from output. Moreover, they are rugged, small in size and have minimal power requirements. The integrated circuit field has profited enormously through the introduction of MOS technology therein.

The present invention is specifically directed to improved integrated circuits. The MOS driver system taught and claimed herein offers the advantages of increased operational speed and system functional versatility with reduced power requirements, and the minimization of the number of "off-chip" components. Other features and advantages of the invention will become apparent from a consideration of the driver circuit configuration and its mode of operation, descriptions of which follows.

SUMMARY OF THE INVENTION

A preferred embodiment of the driver system of the present invention utilizes low threshold MOS devices in a two-phase mode. An LC oscillator, which may also be used for the system clock, provides a peak-to-peak ac output voltage substantially greater than the magnitude of the dc supply potential. This consideration is significant since it means that even with the threshold voltage drops occurring in the system, the MOS drivers will ultimately supply a pulse output having a peak amplitude approximating that of the supply potential. The output of the oscillator is applied to a MOS power supply which provides the operating potential for MOS switching devices in a pair of inverters. The oscillator output is also applied to one or more MOS units which together comprise a threshold shifter. The purpose of the latter is to adjust the duty cycle or "on-off" times of the pulse output waveform. The output of the shifter is applied to one of the aforementioned inverters. The inverter outputs control a pair of drivers, each comprised of an "upper" and a "lower" MOS switching device. The output signal from one of the inverters is coupled in common to the "upper" device in a first driver, and the "lower" device in the second driver. The other inverter output is applied in common to the "lower" device of the first driver and the "upper" device of the second driver. The pulse outputs from the drivers representing alternate phases, are applied to the load.

DESCRIPTION OF THE PREFERRED EMBODIMENT

Before proceeding with a description of the invention it is believed helpful to review briefly the basic operation of the MOS devices used therein.

Figure 1:
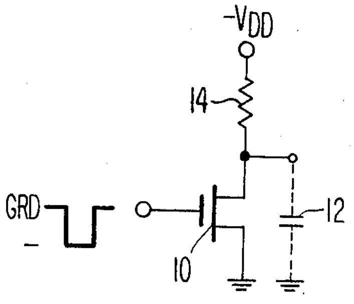
FIG. 1 illustrates a driver circuit comprising an MOS device in combination with a conventional resistor.
Figure 2:
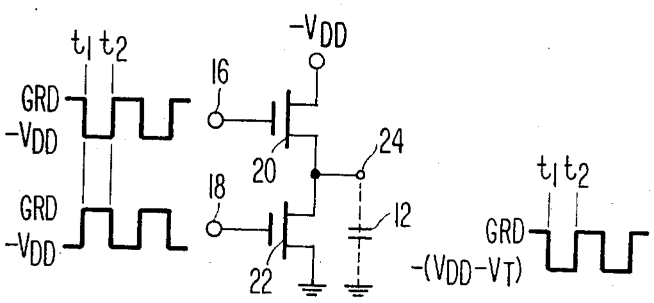
FIG. 2 depicts a driver in which the resistor of FIG. 1 has been replaced by a second MOS device.
Figures 3, 4:
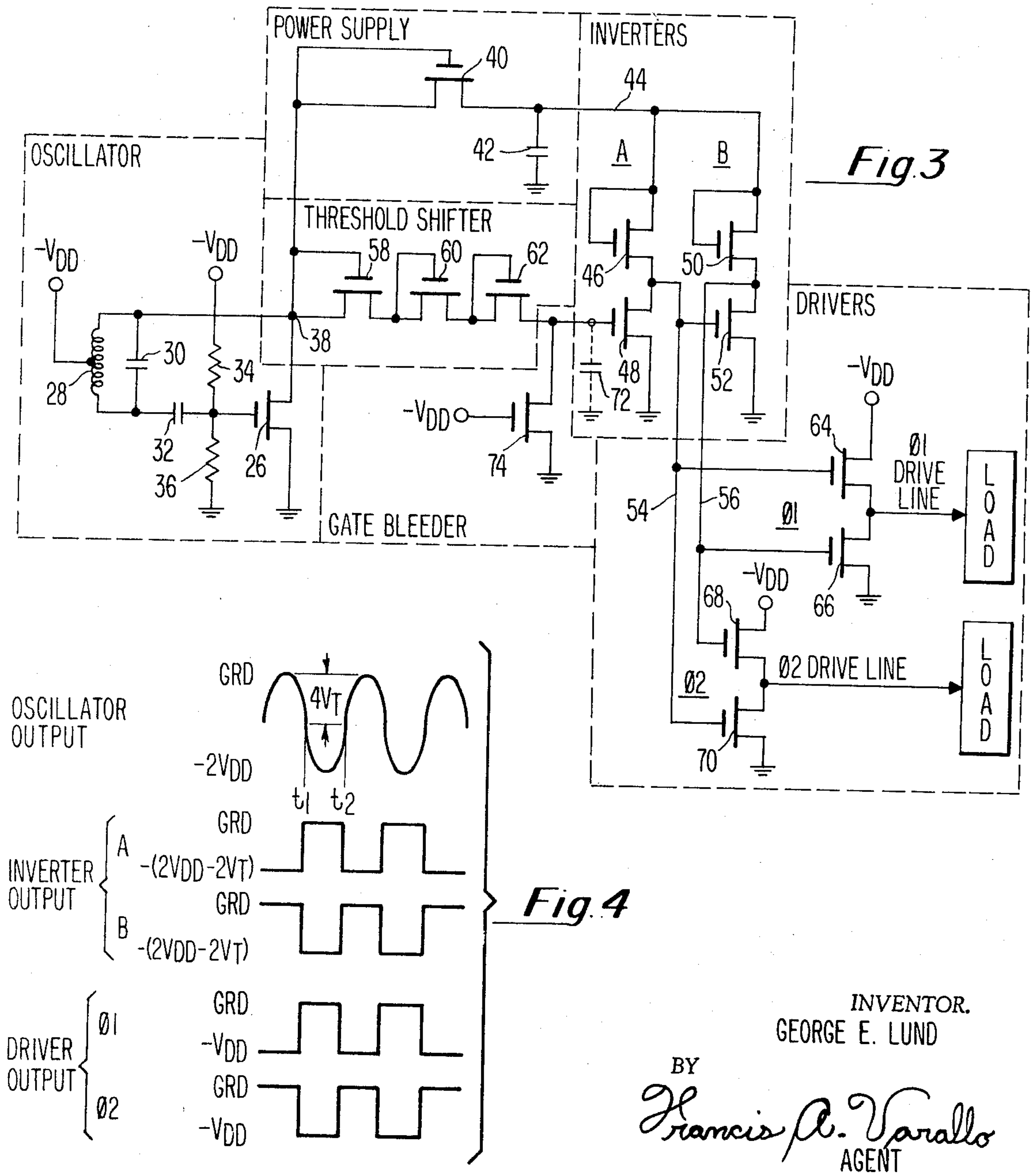
FIG. 3 is a schematic diagram of a preferred embodiment of the MOS integrated circuit driver system of the present invention.
FIG. 4 is a timing diagram useful in understanding the operation of the system of FIG. 3.

The MOS devices depicted in FIGS. 1, 2 and 3 are all of the P-channel enhancement-mode type. It should be emphasized that other types of MOS devices, such as the N-channel type may also be successfully employed and the present invention should not be regarded as limited to the type chosen for purpose of description. The P-channel MOS device utilizes N-silicon as a substrate, into which P+ impurities have been diffused in two parallel strips. The latter are identified respectively as "source" and "drain," and represent two of the device electrodes. When the device is operated, an induced P-region known as the "channel" connects source and drain. The "gate" electrode of that device is a metallic conductor deposited over the source and drain but electrically insulated therefrom and from the substrate.

The P-channel MOS device may be operated by applying a negative voltage to the gate electrode, with the source and substrate at a reference (ground) potential and the drain coupled to a suitable negative dc supply. The negative signal on the gate causes electrons to be repelled from the surface region of the substrate below the gate and holes are attracted to it. As the gate-to-source voltage becomes increasingly negative, the aforementioned surface region "inverts," that is, becomes P-type instead of N-type. This inverted region, the "channel," provides a path for the conduction of charge carriers between source and drain. If the drain voltage is made appreciably more negative than the source, current flows from source to drain. It should be noted that the device can be operated in either direction, and that the source is normally by definition the less negative of the two P-regions. For this reason, although the MOS device electrodes may not be specifically identified as in the drawing (in contrast to the emitter-collector electrode designations of junction transistors), an understanding of the device operation will readily suggest which of the electrodes may be considered source and drain. Moreover, in the drawing, the system is illustrated as being of the integrated circuit variety rather than the discrete component type, and all of the MOS devices are regarded as having a common substrate. Here again, the present driver system is not restricted to the integrated circuit configuration but may employ discrete MOS devices in accordance with particular operating requirements.

An important characteristic of MOS devices utilized in the system is that of the threshold voltage drop inherent in the devices. This voltage drop or threshold value designated $V_T$, is the potential which the gate voltage must reach to neutralize surface charges before the surface region beneath the gate can be inverted to form a channel. Conduction increases in the MOS device as the gate voltage becomes more negative than $V_T$. For low currents, the channel resembles a conventional resistor, and the device operates in a linear region, where the drain-to-source current is proportional to the drain-to-source voltage. As the latter voltage becomes more negative however, a point is reached where the current levels off or saturates. Finally, the "enhancement" mode refers to devices in which the channel is enhanced, that is, induced by the application of voltage to the gate, in contrast to the "depletion" mode where the channel is present in the absence of gate bias.

With reference to FIG. 1, there is depicted a driver circuit incorporating a low threshold P-MOS transistor device 10. The load circuit capacitances are represented by the capacitor 12. Under these conditions, it is apparent that there is no direct current path for the driver current through the load, but rather that the load results from the transient charging of the circuit capacitances. Although only one driver is shown in FIG. 1, it should be apparent that two of these drivers are needed in a two-phase system. Thus, one of the drivers is driven to conduction, that is, turned ON by an input signal applied to the gate electrode of the device, as the other driver is turned OFF. During the phase that the device is OFF, the circuit capacitances are charged through the resistor 14. During the alternate phase when the device is ON, the circuit capacitances are selectively discharged therethrough. The selection of a suitable value of resistance for resistor 14 presents a problem. As the speed of operation of the system increases, the value of resistor 14 must be decreased in order that the circuit capacitances 12 will charge in the time allotted. During the discharge phase, this condition results in a relatively large current drain from the supply $-V_{DD}$ through the resistor 14 and MOS device 10 to ground. In addition to its undesirable power consumption, this circuit configuration requires that a large MOS device, situated "on-chip," and a comparatively high power resistor, located "off-chip," be utilized.

The first step in eliminating the disadvantages of the driver circuit of FIG. 1, is the substitution of a second P-MOS device for the resistor 14, as shown in FIG. 2. Control pulses, 180° out of phase with respect to each other and normally available in a 2-phase system, are applied respectively to terminals 16 and 18, coupled to the gate electrodes of MOS devices 20 and 22. At $t_1$, the control pulse applied to the gate of device 20 is at the $-V_{DD}$ level, device 20 is turned ON and the capacitive load 12 is charged to a level $-(V_{DD}-V_T)$, that is, the negative potential on output terminal 24 is less negative than the supply potential $-V_{DD}$, by the amount of the threshold drop $V_T$ in transistor 20. At this same time, the potential on the gate of device 22 is at ground (GRD) level, and device 22 is OFF. At time $t_2$, device 22 is turned ON by $-V_{DD}$ applied to its gate terminal, and device 20 is turned OFF because its gate electrode is returned to ground potential. The charge on the capacitive load is discharged through device 22 and output terminal 24 rises to ground potential.

It is apparent that in contrast to FIG. 1 the configuration of FIG. 2 involves no direct current drain and that the use of smaller on-chip devices and higher speed operation are possible. There is however a disadvantage in the basic configuration of FIG. 2, in that the driver output at terminal 24 is one threshold ($V_T$) more positive than the negative value of the supply potential, $V_{DD}$. This necessarily results because the gate of the upper device 20 only goes as negative as the supply potential. A full output voltage swing can be obtained if the control voltage applied to gate of transistor device 20 can be made at least one threshold more negative than the potential applied to the drain electrode thereof.

The driver system configuration of FIG. 3 represents a practical solution to this problem. The driver circuit of FIG. 3 depicts an LC oscillator, comprised of P-MOS device 26 and resistors 34 and 36, all located "on-chip" and the frequency determining components inductor 28, capacitor 30 and blocking capacitor 32 situated "off-chip". The oscillator ac output voltage appearing at point 38 and depicted in FIG. 4 may have a peak-to-peak amplitude of $-2V_{DD}$, the voltage swing being from ground to $-2V_{DD}$. This ac voltage is then applied in common to the gate and drain electrodes of a P-MOS transistor 40 which in combination with a small capacitor 42, of the order of 10 pf., form an auxiliary power supply. The power supply P-MOS device 40 is similar to the other devices on the integrated circuit chip. It has an extremely high back resistance and a relatively low forward resistance beyond a voltage drop of one threshold. The capacitor 42 charges to approximately $-(2V_{DD}-V_T)$, the peak ac voltage minus the threshold drop of device 40. The power supply output on line 44 is then available to operate a pair of inverters designated respectively A and B. The inverters are each comprised of an "upper" and a "lower" P-MOS transistor device. The "upper" device in each of the inverters is fabricated to have a relatively large value of resistance in its ON state compared to the "lower" devices which have a small resistance when conducting. The reason for this will become apparent as the operation of the system is further described. Inverter A comprises MOS devices 46 and 48, while inverter B comprises devices 50 and 52. The inverters are needed as buffers and phase inverters to provide the control pulses for the drivers. The peak negative amplitude of the control pulses from inverters A and B appearing respectively on lines 54 and 56 is $-(2V_{DD}-2V_T)$, the latter term resulting from the two threshold drops in device 40 and either device 46 or 50. These inverter output voltages are depicted in FIG. 4. It is important to note that in the system design the potential $-(2V_{DD}-2V_T)$ is made larger (more negative) than $-(V_{DD}+V_T)$ in order that the final driver output swing will be substantially equal to $-V_{DD}$.

The oscillator output at point 38 is applied to a series of three P-MOS devices 58, 60 and 62 which together act as a threshold shifter. The output of the last device 62 is applied to MOS device 48 of inverter A. The threshold drops of devices 58, 60 and 62 are cumulative, so that in effect the oscillator output has swung away from ground toward $-2V_{DD}$ by $-3V_T$ before a signal is applied to the gate of inverter device 48. It should be noted that depending upon the nature of the oscillator output and the value of $-V_{DD}$, more or fewer than the three threshold shift devices depicted in FIG. 4 may be required to move the conduction period of device 48, with respect to the oscillator waveform, to more nearly the 180° level. In the present case, this $3V_T$ drop, together with the additional threshold drop in transistor 48 at time $t_1$, illustrated as $4V_T$ in the oscillator output waveform of FIG. 4, causes device 48 to be turned ON at approximately the 180° point of the oscillator waveform. Obviously the subsequent OFF time for the last device will under these circumstances, be approximately equal to the ON time. This would not be true if the threshold shifter were eliminated and if the oscillator output were applied directly to inverter MOS device 48. Assuming that the supply voltage $-V_{DD}$ is at least several times the threshold drop, device 48 would be turned ON as soon as the negative-going oscillator waveform overcame its $V_T$, and it would remain ON for a considerably longer period than it would be OFF.

With reference to FIGS. 3 and 4, at time $t_1$, device 48 of inverter A is turned ON by the negative potential applied to its gate electrode. The "upper" devices 46 and 50 in both inverters are biased ON by virtue of the power supply negative potential applied in common to the drain and gate electrodes of the respective devices. The output of inverter A appearing on line 54 at the point where the drain electrode of device 48 is connected to the source electrode of device 46 rises substantially to ground potential. The low ON resistance of device 48 compared to that of device 46 insures that the output of inverter A will be very close to ground potential. The P-MOS devices having gates coupled to the inverter A output line 54, namely the "upper" transistor 64 of the $\phi_1$ driver, the "lower" device 70 of the $\phi_2$ driver and the "lower" device 52 of inverter B are all turned OFF in response to this ground level reference potential.

With the turning OFF of inverter B device 52 at time $t_1$, the output line 56 from inverter B emanating from the junction of the drain electrode of device 52 and the source electrode of device 50 falls to the $-(2V_{DD}-2V_T)$ level. This negative potential is applied to the "lower" device 66 of the $\phi_1$ driver and the "upper" device 68 of the $\phi_2$ driver, turning the last-mentioned devices ON.

Summarizing the state of the driver devices at time $t_1$, in the $\phi_1$ driver, transistor device 66 is ON, transistor 64 is OFF. In the $\phi_2$ driver, transistor 68 is ON, device 70 is OFF. The operation of each of the drivers is similar to that described in connection with FIG. 2. The driver output waveforms of FIG. 4 illustrate the rise of the potential on the $\phi_1$ drive line at time $t_1$ to ground level, the negative charge on its associated capacitive load resulting from the preceding cycle of operation, being discharged through ON transistor 66. The potential on the $\phi_2$ driver line at time $t_1$, drops to substantially the supply potential, $-V_{DD}$. It should be remembered that the gate potential applied to transistor 68, namely $-(2V_{DD}-2V_T)$ was specifically chosen to be greater than $-(V_{DD}+V_T)$, the latter term being in this case the threshold value of transistor 68. The capacitive load coupled to the $\phi_2$ drive line is charged to the $-V_{DD}$ level.

At time $t_2$, the oscillator output is positive going, and the signal applied at this time to the gate of inverter transistor 48 turns the device OFF. However, since the P-MOS devices used for threshold dropping have such a large reverse resistance, the gate stray capacitance 72 of device 48 may not discharge fast enough to follow the oscillator output at higher speeds. Accordingly, a gate bleeder comprised of P-MOS device 74 is provided to bleed off the accumulated charge. Device 74 is selected to be of the low current (high ON resistance) type. The gate electrode of device 74 is connected to the $-V_{DD}$ supply. The use of the gate bleeder makes higher speed operation possible and the slightly larger current drain to the oscillator caused thereby is easily tolerated by the system.

With continued reference to FIGS. 3 and 4, at time $t_2$, with the turn OFF of MOS device 48, the potential on line 54 falls from ground to $-(2V_{DD}-2V_T)$ and MOS device 52 of inverter B, as well as devices 64 and 70 of the $\phi_1$ and $\phi_2$ drivers respectively are turned ON. With the turn ON of device 52, the inverter B output line 56 rises from the $-(2V_{DD}-2V_T)$ level to substantially ground potential, thereby turning OFF MOS devices 66 and 68 in the $\phi_1$ and $\phi_2$ drivers respectively. Thus at time $t_2$, in the $\phi_1$ driver, MOS device 64 is ON, device 66 is OFF; in the $\phi_2$ driver, device 70 is ON, device 68 is OFF. The driver output waveforms of FIG. 4 show that the voltage on the $\phi_1$ drive line at time $t_2$ falls to $-V_{DD}$ level, charging the capacitive load to this level. The $\phi_2$ drive line rises to substantially ground level, and the capacitive load previously charged to the supply level, discharges through device 70.

It should be apparent from the foregoing description of the invention and its mode of operation that there is provided an improved integrated circuit MOS driver system characterized by minimal power requirements and its capability of high speed operation with few off-chip components. The techniques described herein are equally applicable to N-MOS circuits and to either "ratioed" or "ratioless" types of MOS devices. Both the rectifying properties and the threshold dropping characteristics of the MOS devices are exploited in the combination of such devices taught herein.

The use of the prefix "MOS," the first two letters referring to "metal-oxide," to identify the devices utilized herein is intended to be generic in nature and to include devices similar in function and operation which may be composed of different materials. For example, insulative materials other than oxides, and conductive materials other than metals may be successfully employed in the fabrication of the devices. For this reason some authorities prefer the use of the term "insulated gate" to identify the field effect transistors used herein, although the term MOS appears to be more commonly used in current technical articles.

It should be understood that changes and modifications of the arrangements described herein may be required to fit particular operating requirements. For example, the phase drivers and/or the inverters may be controlled or gated by either series connected or parallel connected devices in conjunction with the "lower" devices. In this manner, a set of phase drivers may be controlled by other subsystems regardless of the size of each and this control may be either conditional or unconditional. All such changes and modifications, in so far as they are not departures from the true scope of the present invention, are intended to be covered by the claims appended hereto.

What is claimed is:

1. A driver system for supplying outputs to load means comprising a source of alternating current potential, auxiliary power supply means coupled to said source of alternating current potential for converting the latter to a dc voltage, first and second inverters each comprising in series first and second switching means having a common junction, means for applying said auxiliary power supply dc voltage in common to said first switching means of said inverters, means for coupling said source of alternating current potential to the second switching means of said first inverter, first and second drivers each comprising in series first and second switching means having a common output junction, means coupling the common junction of said first and second switching means of said first inverter to the second switching means of said second inverter and to the respective first and second switching means of said first and second drivers, means coupling the common junction of said first and second switching means of said second inverter to the respective second and first switching means of said first and second drivers, said driver system outputs appearing respectively on the common output junctions of said drivers.

2. A driver system as defined in claim 1 wherein said first and second switching means are respectively first and second field-effect transistors.

3. A driver system as defined in claim 2 wherein the series connected first and second transistors of each inverter are coupled between said auxiliary power supply dc voltage and a reference potential, and including means for coupling the series connected first and second transistors of each driver between the system dc supply potential and said reference potential.

4. A driver system as defined in claim 3 wherein said means for coupling said source of alternating current potential to the second transistor of said first inverter includes at least one field-effect transistor having a threshold voltage drop capable of shifting the initiation of conduction in said second transistor of said first inverter by said alternating current potential to a predetermined point on the alternating current waveform, the state of conduction of said second transistor of said second inverter being the inverse of the state of conduction of the second transistor of said first inverter.

5. A driver system as defined in claim 4 wherein said field-effect transistors are of the insulated gate variety.

6. A driver system for supplying phased outputs to a plurality of load means comprising a source of alternating current potential, auxiliary power supply means coupled to said source of alternating current potential for converting the latter to a dc voltage, first and second inverters each comprising in series first and second field-effect transistors connected at a common junction, first and second drivers each comprising in series first and second field-effect transistors connected at a common output junction, each of said transistors having gate, source and drain electrodes, the gate and drain electrodes of the first transistor of each inverter being coupled in common to said auxiliary power supply means, the source electrode of said first transistor and the drain electrode of said second transistor in each inverter being connected at said common junction, the source electrode of said second transistor in each inverter being connected to a reference potential, means coupling the gate electrode of the second transistor of said first inverter to said source of alternating current potential, the common junction of said first and second transistors of said first inverter being connected in common to the gate electrode of the second transistor of said second inverter and to the gate electrodes of the first transistor and the second transistor of the respective first and second drivers, the common junction of said first and second transistors of said second inverter being connected in common to the gate electrodes of the second transistor and the first transistor of the respective first and second drivers, the drain electrode of said first transistor in each driver being coupled to the system dc supply potential, the source electrode of said second transistor in each driver being coupled to a reference potential, the source electrode of said first transistor and the drain electrode of said second transistor in each driver being connected at said common output junction, said driver system phased outputs appearing respectively on the common output junctions of said drivers.

7. A driver system as defined in claim 6 wherein said means for coupling the gate electrode of the second transistor of said first inverter to said source of alternating current potential includes at least one additional field-effect transistor having gate, drain and source electrodes, the gate and drain electrodes thereof being connected in common to said source of alternating current potential and the source electrode thereof being connected to the gate electrode of said second transistor of said first inverter, said additional transistor having a threshold voltage drop capable of shifting the initiation of conduction in said second transistor of said first inverter to a predetermined point on the alternating current waveform, thereby effecting the desired duty cycle of said driver system outputs.

8. A power supply system as defined in claim 6 wherein said means for coupling the gate electrode of the second transistor of said first inverter to said source of alternating current potential comprises a plurality of series connected field-effect transistors, each having gate, drain and source electrodes, the source electrode of one transistor being connected in common to the gate and drain electrodes of the succeeding transistor, the threshold voltage drops in said plurality of transistors being cumulative.

9. A driver system as defined in claim 7 further including a gate bleeder field-effect transistor having gate, drain and source electrodes, the gate electrode thereof being coupled to said system dc supply potential whereby said gate bleeder transistor is maintained in a conducting state, the drain electrode thereof being connected to the gate electrode of said second transistor of said first inverter and the source electrode thereof being connected to said reference potential, the electrical charge developed across the gate capacitance of the second transistor of said first inverter during the conduction thereof, being discharged through said gate bleeder transistor during the period of nonconduction of the former transistor.

10. A driver system as defined in claim 9 wherein said auxiliary power supply comprises a field-effect transistor having gate, drain and source electrodes, the gate and drain electrodes thereof being connected in common to said source of alternating current potential, and the source electrode thereof being coupled in common to the gate and drain electrodes of the first transistor of each of said inverters, and capacitive means connected between the auxiliary power supply transistor source electrode and said reference potential.

11. A driver system as defined in claim 10 further characterized in that said source of alternating current potential is an LC oscillator having a field-effect transistor as its active element, said oscillator transistor having gate, drain and source electrodes, means coupling the parallel connected inductance-capacitance elements between the oscillator transistor gate and drain electrodes, the alternating current output waveform of said oscillator appearing on said oscillator transistor drain electrode, the source electrode of said oscillator transistor being connected to said reference potential.

12. A driver system as defined in claim 11 wherein said first and second transistors of each inverter exhibit by virtue of their geometry respective high and lower values of resistance during conduction.

13. A driver system as defined in claim 12 wherein said source of alternating current has an output waveform of peak-to-peak amplitude of the order of twice the magnitude of said system dc supply potential, the absolute magnitude of the dc output of said auxiliary power supply being less than said alternating current peak-to-peak amplitude by the threshold voltage drop in said auxiliary power supply transistor, the absolute peak pulse output appearing on said common junction of each inverter being less than said auxiliary power supply dc voltage by the threshold voltage drop in the first transistor in each inverter, the outputs appearing respectively on the common output junction of said drivers having an absolute magnitude equal to that of said system dc supply potential.

14. A driver system as defined in claim 13 wherein said field effect transistors are insulated gate devices.

15. A driver system as defined in claim 14 wherein said insulated gate devices are of the P-channel enhancement-mode type.

* * * * *